United States Patent [19]

Irio et al.

[11] 4,275,484
[45] Jun. 30, 1981

[54] OPEN TYPE CLAMP

[75] Inventors: Francis Irio, Chabris; Richard Chene, Selles St Denis, both of France

[73] Assignee: Etablissement Caillau, Boulogne-Billancourt, France

[21] Appl. No.: 3,754

[22] Filed: Jan. 15, 1979

[30] Foreign Application Priority Data

Jan. 18, 1978 [FR] France .................................. 78 01401

[51] Int. Cl.³ ........................ B65D 63/06; F16L 33/02
[52] U.S. Cl. ................................ 24/20 R; 24/23 EE
[58] Field of Search ............ 24/20, 20 CW, 22, 23 R, 24/21, 270, 23 EE, 23 W, 20 EE, 20 TT

[56] References Cited

U.S. PATENT DOCUMENTS

| 1,631,396 | 6/1927 | Beegle | 24/20 CW |
|---|---|---|---|
| 3,295,176 | 1/1967 | Bright | 24/20 CW |
| 3,303,669 | 2/1967 | Oetiker | 24/20 R |

FOREIGN PATENT DOCUMENTS 1046710  10/1966  United Kingdom ................ 24/20 CW

*Primary Examiner*—Thomas J. Holko
*Attorney, Agent, or Firm*—Lewis H. Eslinger

[57] ABSTRACT

An "open" type clamp constituted by a wound over metal strip 1, comprising two radial folds or ears 2–5, whereas a first ear is bent over and is provided with an extension directed along the periphery of the clamp to constitute a sole 4 which extends substantially over the distance separating the two ears. The second ear 5 has an extension 6 which is substantially parallel to the periphery of the clamp and extends as far as close to the first ear 2, comprising at its end a portion 7 bent towards the clamp.

6 Claims, 3 Drawing Figures

OPEN TYPE CLAMP

Open type clamps are already known, and in particular from French Pat. No. 789,138, for mounting a flexible coupling, such as for example a rubber hose connection, on a rigid pipe. Such a clamp is constituted by a metal strip whose ends are brought together during the tightening operation. The two ends of the strips are provided to this effect with radial folds or ears, traversed by a screw of which the head rests on one of the ears, while a nut, resting on the other ear, makes it possible to bring the two ends of the strip together.

In order to avoid that the coupling to be mounted penetrates the empty space situated between the two ears, there is advantageously provided on one of them a bent over extension forming a sole situated on the periphery of the clamp and extending substantially between the two ears.

Such an "open" clamp may thus be dismantled and wed again, but its manufacture requires several independent parts and moreover, its use is rather time-consuming.

A clamp of the "closed" type is also known, in particular from U.S. Pat. Nos. 3,020,631 and 3,602,954, in which the constitutive strip is provided with at least two radial folds slightly apart and connected together by the strip itself which is then situated in parallel to the periphery of the clamp, but at a certain distance thereof. Such an arrangement makes it possible to tighten the clamp by means of a tool, shaped as pliers, which brings the two radial ears together while causing a permanent deformation of the portion of strip connecting them.

An "open" type clamp is also known from French Pat. No. 1,413,023, whose ends are constituted by additional U-shaped parts, meant to fit into one another. After what, the radial folds formed by the U-shaped portions of the clamp are brought together by means of a pliers-type tool, this causes a permanent deformation of the said U parts and thus ensures the tightening of the clamp.

However, the "closed" type clamps, as well as the "open" type ones described in French Pat. No. 1,413,023, have the following disadvantages: they are not easy to disconnect and in particular they cannot be used again because of the permanent deformation of the strip caused during the tightening operation.

Finally, it should be recalled that the "closed" type clamps are nowadays often produced from a tube from which "sections" are cut, but that in some cases, there are certain disadvantages in such a production. On the other hand, "open" type clamps may be produced from a strip, suitably shaped by rolling, stamping or other similar and generally simple techniques.

The aim of the present invention is to improve on clamps of the "open" type and to simplify their production while getting the maximum from the advantages of the "closed" type clamps; it is its further aim to produce clamps which can be used again.

To this effect, the object of the invention is a clamp, of the "open" type, constituted by a wound over strip of metal and comprising, close to the strip ends, two radial folds or ears. A first ear is bent over so as to be constituted by two back-to-back portions of the strip, and it is provided with an extension directed along the periphery of the clamp to constitute a sole which extends at least in the area situated between the two ears, from the first to the second ear.

According to the invention, the second ear is provided with an end portion extending substantially parallel to the periphery of the clamp and situated at a distance therefrom which is about the height of an ear, said end portion extending as far as close to the first ear, and comprising at its end a part bent towards the clamp, for example towards its centre.

The invention will be better understood and its advantages and secondary characteristics will become obvious on reading the following description of certain preferred embodiments given by way of example only.

Reference will be made to this effect to the accompanying drawings in which.

Figure 1:
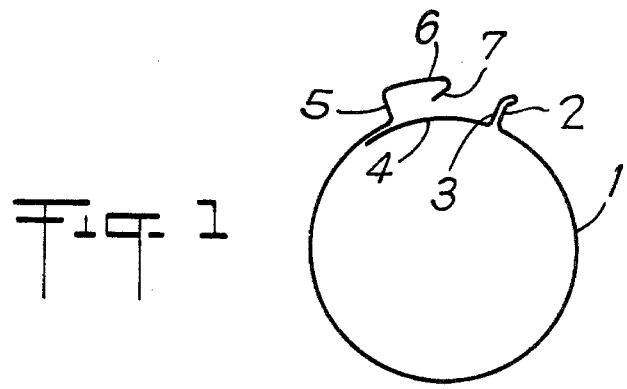
FIG. 1 is a diagrammatical elevational view of a clamp according to the invention.

Referring first to FIG. 1, it is seen that the clamp is essentially constituted by a strip 1 of metal which is wound over, and whose ends are independent one of the other. In the vicinity of one of its ends, a radial fold or ear 2 is bent outwardly of the clamp over a certain height. A first bent over portion defines a second part 3 of the radial fold, whereas after a second bending over of the strip, the ear 2-3 comprises an extension 4 directed along the periphery of the clamp towards the other end of the strip 1.

Close to the other end of the clamp, the strip is provided with a second radial fold or ear 5 whose height is substantially equal to that of the first ear 2-3, preferably slightly higher. A bent over portion of the strip creates on the ear 5 an extension 6 which extends substantially in parallel to the periphery of the clamp. The end of extension 6 is bent once more substantially inwards of the clamp, along a fairly short portion 7, preferably to form an acute angle with the said extension 6.

Figure 2:
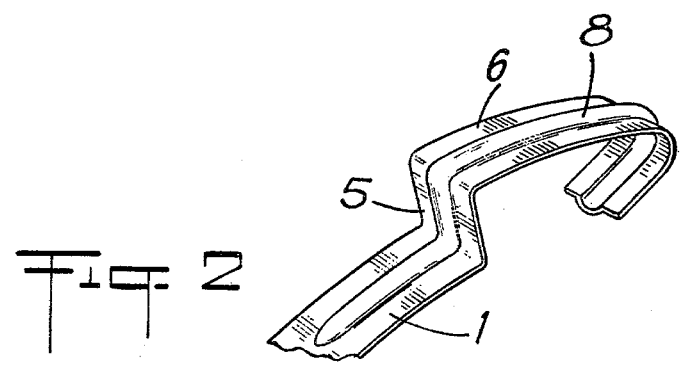
FIG. 2 is an enlarged partial perspective of the outer portion of strip situated between the two ears.

Pursuant to what is shown in FIG. 2, the extension 6 of the second ear advantageously comprises a rigidifying longitudinal rib 8, which prevents that part of the clamp from deforming during the tightening operation.

However, this extension 6 of the second ear 5, extends when in the untightened state, this side of the first ear 2-3 which it thus does not fully cover. Furthermore, the first ear 2-3 is preferably provided, as shown in FIG. 1, with a slightly bent end. It is however obvious that the ear may be radial or, on the contrary, totally inclined in order to form with the periphery of the strip an acute angle adjacent that formed by the bent end 7 and the portion 6.

To tighten the clamp, a plyers-shaped tool is pressed against the ears 2-3 and 5; the bent end 7 passes behind the ear 2-3 whose bent end portion thus constitutes a fastening member. There is thus no permanent deformation of the strip during the tightening operation, and the clamp may be used again after unfastening the bent end 7 and the ear 2-3 with the appropriate tool.

Figure 3:
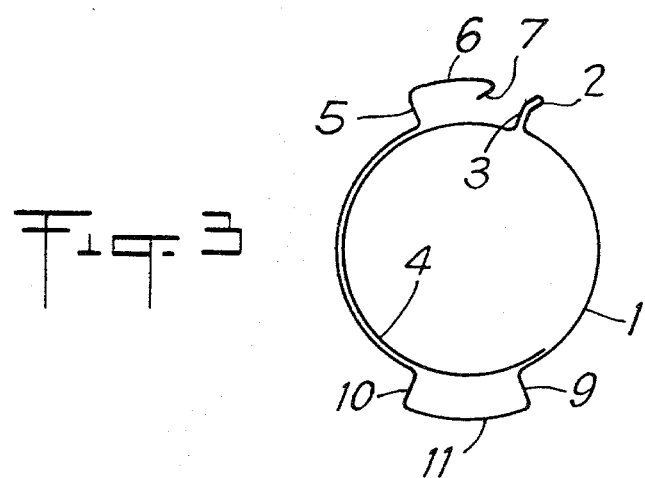
FIG. 3 is a diagrammatical elevational view of a variant embodiment of the clamp shown in FIG. 1.

FIG. 3 shows an embodiment similar to that hereinabove described with reference to FIG. 1. The same references designate the same elements. The strip 1 however is provided with an additional tightening assembly, which is preferably diametrically opposite the tightening and fastening members 2-3, 5, 6 and 7. The additional tightening assembly is constituted by two ears 9-10 slightly apart and connected together by a portion 11 of the strip which extends substantially in parallel to the periphery of the clamp. Said tightening assembly is of course used, in known manner, in the "closed" clamps described for example in U.S. Pat. No. 3,602,954.

It should however be noted that, in order to avoid that the coupling to be tightened penetrates the space between the two ears 9-10, the extension 4 of the ear 2-3 is prolonged and extends substantially over that space, in the vicinity of the ear 9.

Thereagain it would be advantageous for the portions 6 and 11 of the strip to be shaped as shown in FIG. 2 and as described hereinabove.

This last embodiment will be preferably used for fixing couplings of even large diameters because of the great tightening possibilities which it offers. To this effect, it is obvious that the clamp may comprise one or more additional tightening assemblies, such as those shown in 9, 10 and 11.

What is claimed is:

1. An "open" type clamp, comprising a wound metal strip having two ends and provided, close to the two ends of the strip, with a set of first and second radial ears, respectively, said first ear being bent over with respect to the strip such that said strip extends therefrom with a first extension directed along the periphery of the clamp and extending at least over the distance separating the two ears, from said first ear towards the second ear, and said second ear being provided with an extension which is substantially always parallel to the periphery of the clamp and situated at a distance therefrom nearly equal to the height of said first ear and including at its end a portion bent inwardly of the clamp, said last-mentioned portion being spaced from the periphery of the clamp a distance less than the height of said first ear so that said last-mentioned portion is adapted to ride over and engage said first ear by means of a spring-like action to tightly fix said clamp about an object, without any permanent deformation of said first and second ears.

2. A clamp as claimed in claim 1, wherein the extension of the second ear is extended before the clamp is tightened and wherein said bent portion is relatively short.

3. A clamp as claimed in claim 1 or 2, wherein the extension of the second ear is provided with a rigidifying longitudinal rib.

4. A clamp as claimed in claim 1, wherein said first ear is bent over so as to be constituted by two back-to-back portions of the strip.

5. An "open" type clamp, comprising a wound metal strip having two ends and provided, close to the two ends of the strip, with a first set of first and second radial ears, respectively, said first ear being bent over with respect to the strip such that said strip extends therefrom with a first extension directed along the periphery of the clamp and extending at least over the distance separating the two ears, from said first ear towards said second ear, and said second ear being provided with an extension which is substantially always parallel to the periphery of the clamp and situated at a distance therefrom nearly equal to the height of said first ear and including at its end a portion bent inwardly of the clamp, said last-mentioned portion adapted to engage said first ear to securely fix said clamp about an object, without any permanent deformation of said first and second ears, and wherein the strip is provided with at least one other set of radial ears connected together by the strip, which strip is separated by a distance from the periphery of the clamp, which is substantially equal to the height of said other set of ears, wherein the first extension extends at least as far as the space situated between the ears of the other set.

6. A clamp as claimed in claim 5, wherein said first ear is bent over so as to be constituted by two back-to-back portions of the strip.

* * * * *